A. R. SANDT, C. F. WALZ AND M. L. STAHL.
PLATFORM AND MUD GUARD.
APPLICATION FILED NOV. 10, 1919.
1,337,275. Patented Apr. 20, 1920.
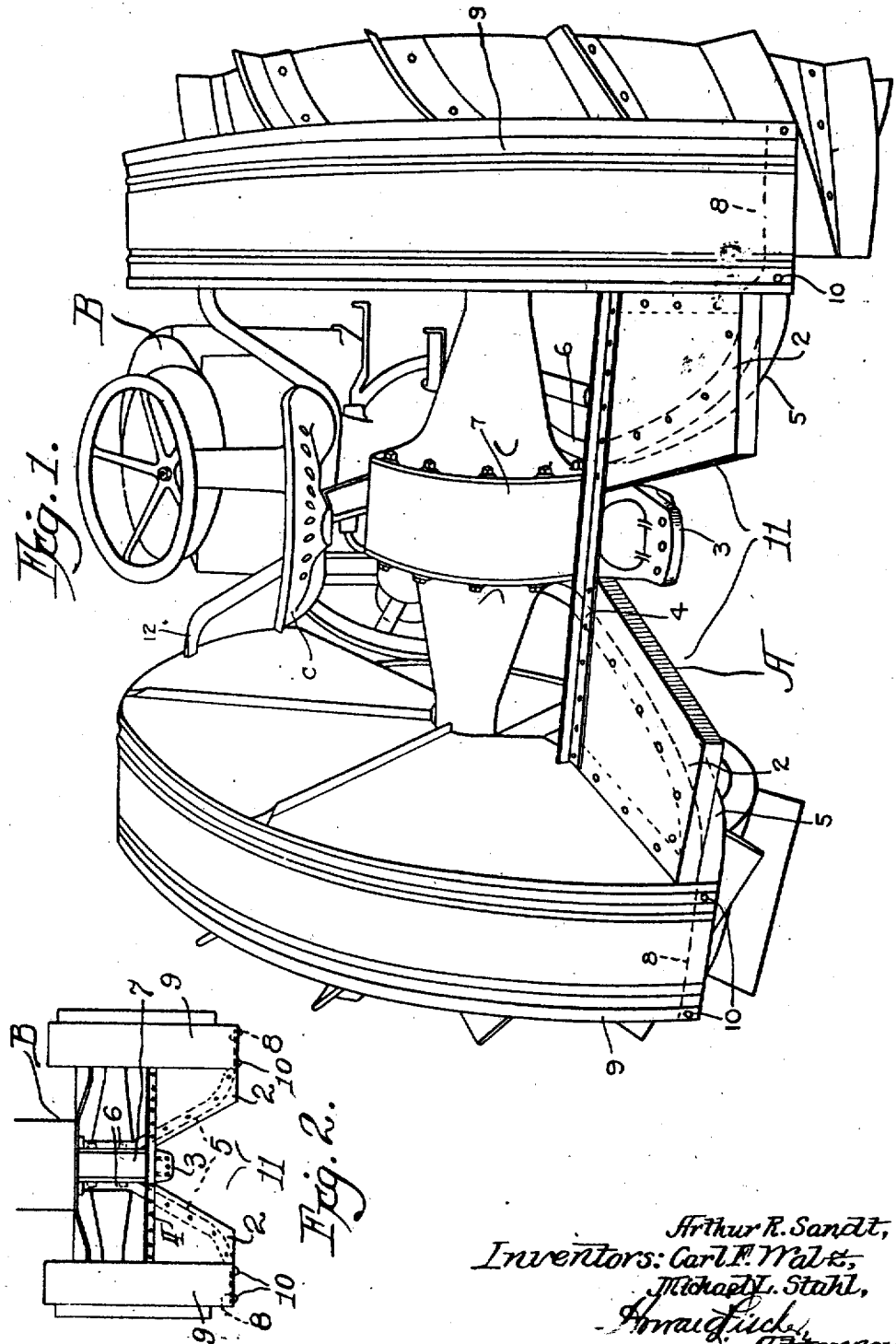
Inventors: Arthur R. Sandt,
Carl F. Walz,
Michael L. Stahl,
Attorney.

UNITED STATES PATENT OFFICE.

ARTHUR R. SANDT, CARL F. WALZ, AND MICHAEL L. STAHL, OF MINNEAPOLIS, MINNESOTA.

PLATFORM AND MUD-GUARD.

1,337,275.  Specification of Letters Patent.  Patented Apr. 20, 1920.

Application filed November 10, 1919. Serial No. 337,046.

*To all whom it may concern:*

Be it known that we, ARTHUR R. SANDT, CARL F. WALZ, and MICHAEL L. STAHL, citizens of the United States, residing at Minneapolis, in the county of Hennepin and State of Minnesota, have invented a new and useful Improvement in Platforms and Mud-Guards, of which the following is a specification.

Our invention relates to a platform and mudguard, which is particularly adapted for use in connection with a tractor where it is desired to get a close connection with the drawbar coupling on the tractor. On many tractors it is very inconvenient to operate them without foot platform and the manufacturers of the tractors have left off, in many instances, the foot platform so as to give a close connection of the plow or other implement which is being drawn by the tractor to the tractor drawbar coupling.

A foot platform is most conveniently positioned at a point on a tractor at a place where the drawbar connection should be made and thus heretofore in tractors, where a foot board is used, the drawbar coupling is usually placed outside of the same. This construction does not allow a close connection with the implement which is connected to the tractor.

Our invention provides a divided platform, which exposes the drawbar coupling and is connected with suitable fenders or mudgards, which are adapted to protect the operator of the tractor. Our device is particularly suited to a tractor where the operator sits practically directly over the rear axle, and of the short coupling type.

In the drawing forming part of this specification:

Figure 1 is a perspective rear view of an ordinary, well-known tractor, illustrating our foot platform and mudguards attached thereto.

Fig. 2 is a diagrammatic plan view of our platform and mudguards, illustrating only a portion of the tractor to which they are attached.

The drawing illustrates a divided foot platform A, which is divided centrally to form two foot boards 2, which are positioned on either side of the tractor drawbar coupling 3. A suitable angle iron brace 4 extends across the front portion of the foot boards 2 to connect the same rigidly together, and angle iron arms 5 extend below the foot platforms or foot boards 2, being secured thereto in a suitable manner. The forward ends 6 of the angle members are secured in a suitable manner to the lower portion of the rear axle 7 of the tractor B. The rear ends of the angle arms 5 are bent to extend outward and are flattened on their outer ends at 8. The ends 8 of the angle members 5 are secured to the fenders 9 by rivets 10, or other suitable means.

The inner edges of the foot boards 2 slant outwardly toward the fenders 9 to form a large open space 11 in the foot board A and to fully expose the drawbar coupling 3 of the tractor to allow the connecting arm or tongue of an implement to be secured to the drawbar coupling and to allow side play together with any up and down motion of the connecting tongue without interfering with the foot platforms 2, and allowing the implement to be connected very close to the tractor rear axle. This construction is most desirable in a tractor, as it is possible to get the utmost efficiency out of the operation of the tractor.

The fenders or mudguards 9 are connected on their forward end by the brace arm 12, which extends across the tractor in front of the seat C and is rigidly connected centrally to the tractor frame. The brace 12 holds the forward ends of the fenders 9 rigidly to the tractor B, while the rear ends of the fenders are rigidly secured to the foot platforms 2 and braced by the angle members 5, together with the member 4. This gives a rigid, durable construction and is secured to one of the well-known tractors by only removing a few of the nuts on the same and using the same holes to secure the platform-foot board and fenders.

The size of the opening 11 between the foot platforms 2 can be of any suitable dimension so as to leave a sufficient portion only for the operator of the tractor to conveniently stand on the same. Thus, with this construction, it is possible to make a closeup connection with the drawbar coupling 3 and is very convenient for the operator of the tractor if he desires to stand while operating the same or if he is positioned in the seat C. The fenders 9 are a very essential feature in the device, as they protect the operator from the dust, mud, etc., of the driving wheels of the tractor and also protect him from the ground engaging cleats, which are practically as dangerous to the operator as a rotating gear wheel when the tractor is in operation. The combination of the guards and foot platform with the tractor, the foot platform being divided to allow the free operation of the draw tongue of an implement connected with the tractor performs a function which is most desirable and is now in demand on tractors of this type.

In accordance with the patent statutes we have described the principles of operation of our invention, together with the apparatus which we now consider to represent the best embodiment thereof, but we desire to have it understood that the construction shown is only illustrative and that the invention can be carried out by other means and applied to uses other than those above set forth within the scope of the following claims.

We claim:

1. The combination with a tractor, drivewheel fenders, foot platforms on either side of the drawbar coupling and angle iron braces connecting the forward end of said platforms with said tractor and the rear end of said platforms with said fenders to rigidly connect said fenders, platforms and tractor with an open space at the drawbar coupling to allow free movement of the tongue when secured to the tractor coupling.

2. The combination with a tractor, including a divided foot platform to expose the drawbar coupling for easy, close connection with an implement and wheel fenders connected to said foot platform and tractor.

3. A foot platform and wheel fenders, in combination with a tractor having a drawbar coupling secured to its rear axle, drivewheel fenders, means connecting said fenders rigidly to said tractor and a divided foot platform extending on either side of the drawbar coupling with an open space on either side of the coupling to allow a close hitch to said tractor.

4. A device of the class described in combination with a tractor, drivewheel fenders to protect the operator and a horizontal platform having a central recess to the drawbar coupling for the purposes specified.

5. The combination with a tractor having a drawbar coupling in close proximity to its rear axle and a foot platform rigidly secured to said tractor having a central opening to expose the drawbar coupling, whereby a close hitch can be made with said tractor.

6. The combination with a vehicle having a drawbar coupling, a horizontal platform, means for securing said platform rigidly to said vehicle, a centrally disposed recess having outwardly diverging inner sides to form an open space for a drawbar or tongue to be connected with the vehicle drawbar coupling and to allow free movement of the drawbar or tongue without interfering with said platform.

7. The combination with a tractor, including a pair of drivewheel fenders, a foot board, a central opening formed in said foot board with outwardly diverging sides to expose the drawbar coupling of said tractor to allow a close hitch, an angular brace extending across one side of said foot board and angle iron members adapted to rigidly secure said fenders and foot board to said tractor.

ARTHUR R. SANDT.
CARL F. WALZ.
MICHAEL L. STAHL.